United States Patent [19]
Janning

[11] Patent Number: 6,167,126
[45] Date of Patent: Dec. 26, 2000

[54] METHOD FOR FLEXIBLY PROVISIONING SWITCHING DEVICES AND A SWITCHING DEVICE INCORPORATING THE SAME

[75] Inventor: William J. Janning, Allen, Tex.

[73] Assignee: Northern Telecom Limited, Montreal, Canada

[21] Appl. No.: 09/186,733

[22] Filed: Nov. 4, 1998

[51] Int. Cl.$^7$ ..................................................... H01M 3/42
[52] U.S. Cl. ........................................... 379/201; 379/157
[58] Field of Search ................................... 379/201, 204, 379/112, 113, 122, 144, 203

[56] References Cited

U.S. PATENT DOCUMENTS

| | | | |
|---|---|---|---|
| 5,337,351 | 8/1994 | Manabe et al. | 379/201 |
| 5,404,396 | 4/1995 | Brennan | 379/201 |
| 5,448,631 | 9/1995 | Cain | 379/201 |
| 5,657,451 | 8/1997 | Khello | 379/201 |
| 5,737,403 | 4/1998 | Zave | 379/201 X |

*Primary Examiner*—Creighton Smith
*Attorney, Agent, or Firm*—Haynes and Boone LLP

[57] ABSTRACT

A switching device includes a call processing application which handles interactions with originating agents in accordance with a flexible interaction framework. The switch is provisioned with an interaction module in which a plurality of primitives, termed "collectables", each comprised of at least one instruction to be processed during execution thereof, reside. The flexible interaction framework is a list of selected ones of the collectables which are to be executed during interactions and a sequence of execution for the list of selected collectables. The call processing application handles interactions with originating agents by executing the collectables maintained in the list in accordance with the sequence of execution. At least one of the collectables maintained in the list contains instructions which, when executed, modifies the sequence of execution. The sequence of execution may be modified by: (a) inserting at least one additional collectable into the sequence of execution; (b) forming a sub-list of at least one additional collectable, branching the list to the sub-list when a certain collectable is executed and branching to a next one of the collectables in the list when a last collectable of the sub-list is executed; (c) appending a collectable to the list of selected collectables; or (d) replacing a collectable maintained in the list of selected collectables with at least one collectable not maintained on the list. In this manner, dialing plans and other interactions between the switching device and originating agents which are defined by the interaction framework may be readily modified.

19 Claims, 4 Drawing Sheets

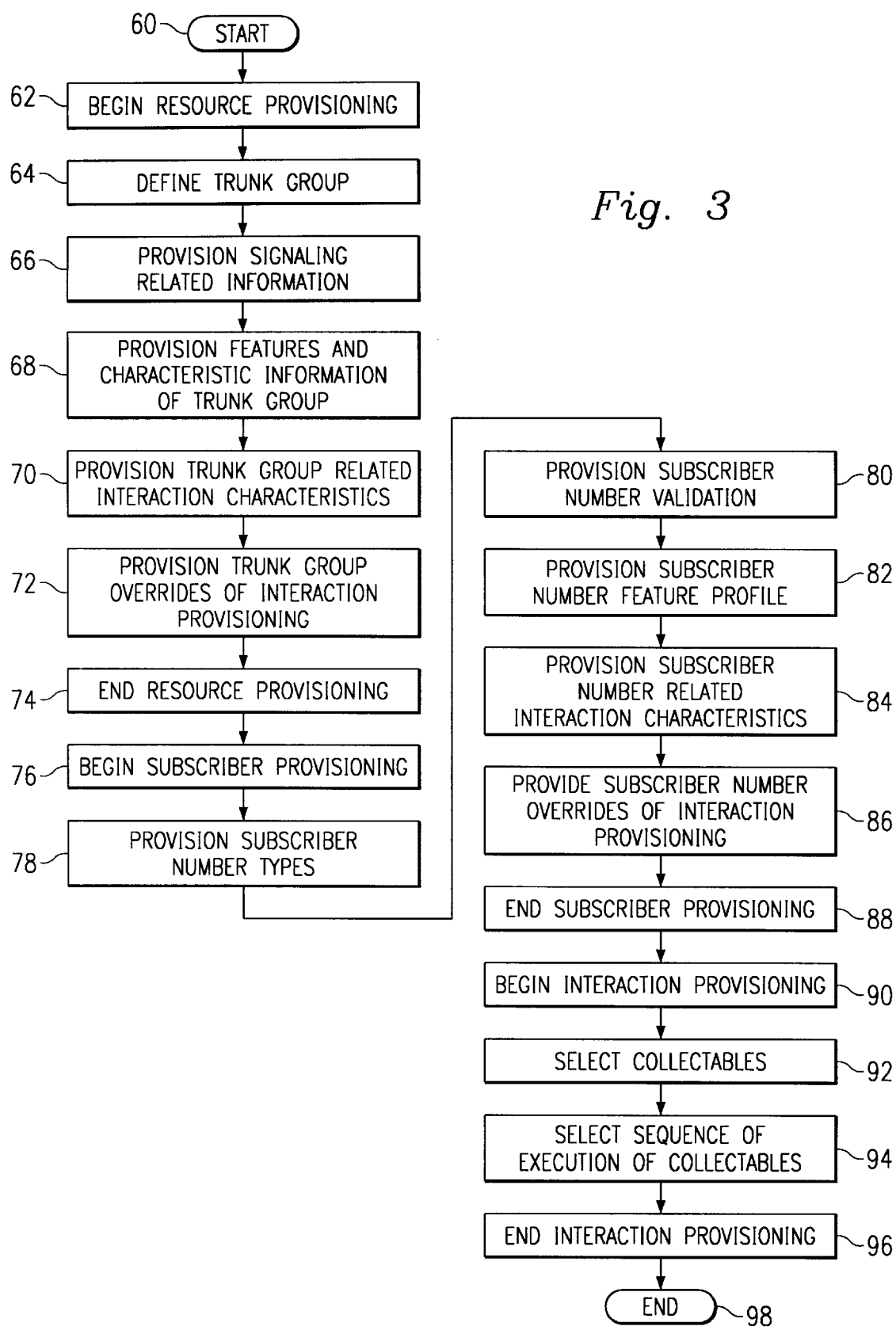

METHOD FOR FLEXIBLY PROVISIONING SWITCHING DEVICES AND A SWITCHING DEVICE INCORPORATING THE SAME

TECHNICAL FIELD

The invention relates generally to switching devices for a telecommunication networks and, more particularly, to a method for flexibly provisioning a switching device for interactions with originating and terminating agents for a call.

BACKGROUND OF THE INVENTION

To complete a call requested by an originating agent, a switching device must interact with the originating agent in order to collect the information needed to setup and route the call to a terminating agent. Furthermore, the switching device must be supplied (or "provisioned") with information on how to conduct the interaction with the originating agent. Resource provisioning provides the switching device with the information necessary for interaction with the originating agent. For example, an interaction protocol for a trunk group to which the originating agent belongs would be part of the resource provisioning provided to the switching device. Interaction provisioning defines the "dialing plan", i.e., the interaction between the switching device and the originating agent that must occur in order for the switching device to collect the information needed to setup and route the call. Subscriber provisioning defines the types of subscriber numbers which the switching device acquires from the originating agent for use in authorizing subscribers and subscriber based features. Finally, translations provisioning provides the switching device with the information necessary for interaction with the terminating agent. These various provisionings of the switching device may be collectively viewed as a framework which controls interactions between the switching device and originating/terminating agents.

In the past, the interaction framework, i.e., the resource, interaction, subscriber and translation provisioning, was hardcoded into the switching device. Accordingly, the interaction framework for a switching device has always been considered relatively inflexible in that, once in place, a modification thereto required the service provider, i.e., the owner of the switching device, to retain the services of the manufacturer to recode the switch. As a result, to modify the switching device often cost many thousands of dollars and required months, or even years, to complete.

It can be readily seen that a switching device having a easily modifiable interaction framework would be highly desirable. It is, therefore, the object of this invention to provide such a switching device.

SUMMARY OF THE INVENTION

The present invention, accordingly, provides a switching device uniquely configured such that access providers can readily modify (or "reprovision") the interaction of the device with originating agents The present invention further provides an associated method for flexibly provisioning a switching device for such interactions.

Residing at the switching device is a call processing application which handles interactions with originating agents in accordance with a flexible interaction framework. The switch is provisioned with an interaction module in which a plurality of primitives, hereafter termed "collectables", each comprised of at least one instruction to be processed during execution thereof, reside. The flexible interaction framework is a list of selected ones of the collectables which are to be executed during interactions and a sequence of execution for the list of selected collectables. The list of selected collectables, as well as the sequence of execution, is maintained by a collectable management application coupled to the interaction module. The call processing application handles interactions with originating agents by executing the collectables maintained in the list in accordance with the sequence of execution.

In accordance with further aspects of the invention, at least one of the collectables maintained in the list may contain instructions which, when executed, modifies the sequence of execution. In various aspects thereof, modification of the sequence of execution may be accomplished by: (a) inserting at least one additional collectable into the sequence of execution; (b) forming a sub-list of at least one additional collectable, branching the list to the sub-list when a certain collectable is executed and branching to a next one of the collectables in the list when a last collectable of the sub-list is executed; (c) appending a collectable to the list of selected collectables; or (d) replacing a collectable maintained in the list of selected collectables with at least one collectable not maintained on the list. In this manner, dialing plans and other interactions between the switching device and originating and/or terminating agents which are defined by the interaction framework may be readily modified.

BRIEF DESCRIPTION OF THE DRAWINGS

FIG. 3 is a flow chart of a method for flexibly provisioning the switching device of FIGS. 1–2.

DETAILED DESCRIPTION OF A PREFERRED EMBODIMENT

Figure 1:
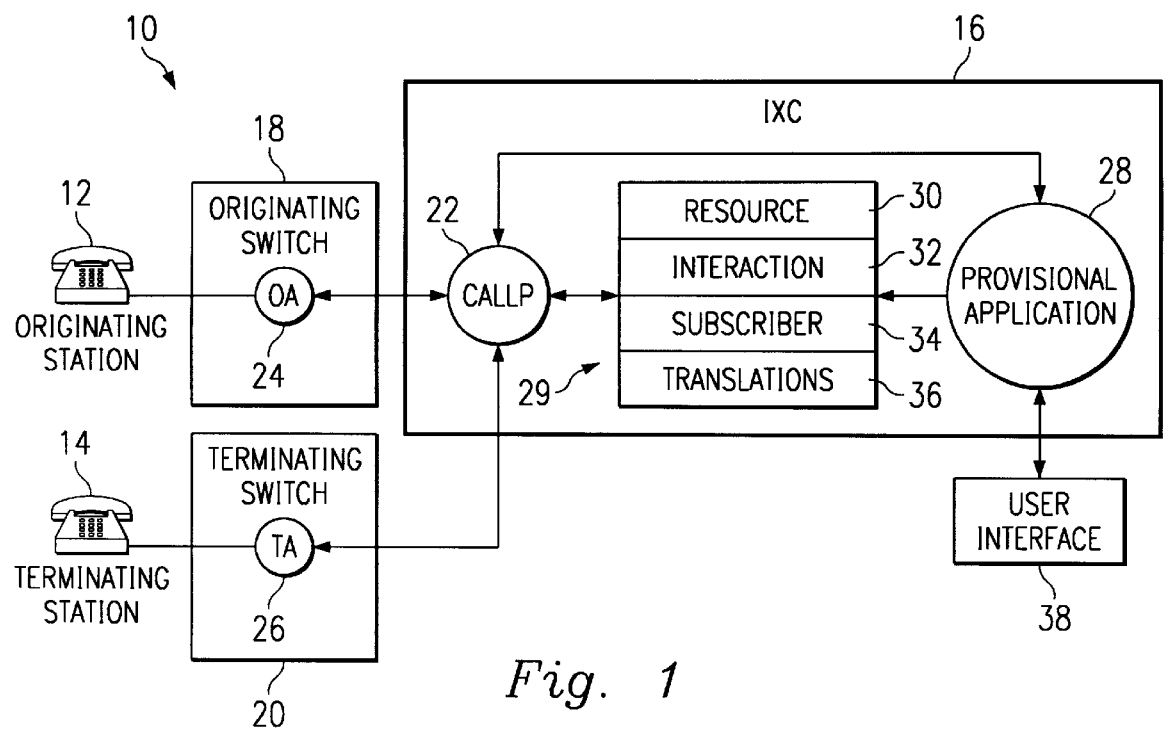
FIG. 1 is a block diagram of a telecommunications network which includes a switching device constructed in accordance with the teachings of the present invention and equipped for flexible provisioning of interactions with agents

Referring first to FIG. 1, the reference numeral 10 designates a telecommunications network. While, in the disclosed embodiment of the invention, a public switched telephone network (or "PSTN") is selected as the telecommunications network 10, it should be clearly understood that the invention is equally suitable for use with other types of telecommunication networks. The telecommunications network 10 includes an interexchange carrier (or "IXC") switch 16, for example, a UCS DMS-250 switch manufactured by Northern Telecom, Ltd. of Montreal, Canada, which directs a call initiated by an originating station 12 to a terminating station 14. In the embodiment of the invention disclosed herein, the originating and terminating stations 12 and 14 are the originating and terminating phone terminals for the call. In an alternate embodiment of the invention not illustrated herein, the originating and terminating stations 12 and 14 may be trunks which couple the IXC switch 16 to other switches (not shown). The originating and terminating stations 12 and 14 are coupled to the IXC switch 16 by originating switch 18 and terminating switch 20, respectively. While, in various embodiments of the invention, the originating and terminating switches 18 and 20 may be local exchange carriers (or "LECs"), private branch exchanges (or "PBXs") or IXC switches, as disclosed herein, the originating switch 18 is an LEC switch and the terminating switch 20 is an IXC switch.

Before continuing further, it should be clearly understood that the PSTN or other telecommunications network 10 will typically include includes a wide array of other, conventional, devices which have been omitted from FIG. 1 for ease of illustration. Similarly, various components of the IXC switch 16, the originating switch 18 and the terminating switch 20 have also been omitted from FIG. 1, again for ease of illustration. Finally, while, as disclosed herein, the present invention resides within the IXC switch 16, it should be clearly understood that the invention is equally suitable for use in other environments.

The IXC switch 16 is comprised of various hardware and software components which enable it to complete a requested connection between the originating and terminating stations 12 and 14. One such component is a call processor (or "CALLP") application 22, a software application executable by a processor subsystem (not shown) of the IXC switch 16. The CALLP application 22 handles exchanges with the originating station 18 and the terminating station 20 when completing a connection between the originating station 12 and the terminating station 14. As will be more fully described below, the CALLP application 22 handles a call by interacting with an originating agent (or "OA") 24 residing at the originating switch 18 and a terminating agent (or "TA") 26 residing at the terminating switch 20.

While the CALLP application 22 handles the interactions with the OA 24 and the TA 26 necessary to complete a requested connection between the originating and terminating stations 12 and 14, information stored within a provisioning module 29 is used to define the interaction between the CALLP application 22 and the OA 24/TA 26 when completing the requested connection. The provisioning module 29 is comprised of plural components, each related to a different aspect of the interaction which occurs during call setup and routing. As disclosed herein, the provisioning module 29 is comprised of a resource provisioning module 30, an interaction provisioning module 32, a subscriber provisioning module 34 and a translations provisioning module 36, each of which may correspond to a region, area, or other defined portion of a memory subsystem (not shown) of the IXC switch 16.

Broadly speaking, the IXC switch 16 is provisioned by storing, within the appropriate one of the provisioning modules 30, 32, 34 and 36, the information needed for the CALLP application 22 to handle interactions with the OA 24/TA 26. The information may be arranged, as in the resource, subscriber and translations provisioning modules 30, 34 and 36, in the form of a traditional database type of datafill or arranged or, as in the interaction provisioning module 32, in the form of as a collection of discrete elements. The information stored in the resource provisioning module 30 provides trunk group, trunk group member and other resource information to the CALLP application 22. The interaction provisioning module 32 contains the information used to define the interaction between the CALLP application 22 and the OA 24/TA 26. The subscriber provisioning module 34 contains the information used to screen valid subscribers and to identify subscriber based features for calls. Finally, the translations provisioning module 36 contains the information related to various translation systems.

Also residing within the IXC switch 16 and executable by the processor subsystem thereof, is a provisioning application 28. The provisioning application 28 may be a separate application as shown in FIG. 1. Alternately, the provisioning application 28 may form a component of the CALLP application 22. As will be more fully described below, the provisioning application 28 provides plural services to the IXC switch 16, including: (a) provisioning of the provisioning module 29; (b) defining the interaction framework to be used by the CALLP application 22 when handling a call; and (c) managing the interaction framework. Each of these services may be performed by a system administrator accessing the provisioning application 28 via a user interface 38.

As previously stated, interactions between the CALLP application 22 and the OA 24/TA 26 are defined by the interaction provisioning module 32. Unlike the other provisioning modules 30, 34 and 36, the interaction provisioning module 32 contains a plurality of reusable components, hereafter referred to as "collectables", each of which is a discrete script file which defines an independently executable interaction between the CALLP application 22 and the OA 24/TA 26 and is preferably stored within the portion of the memory subsystem reserved for the interaction provisioning module.

When a collectable is stored within the interaction provisioning module 32, for example, by causing the provisioning application 28 to write the corresponding script file into the memory subsystem, the IXC switch 16 is said to have been provisioned with that collectable. Once provisioning of the IXC switch 16 is complete, the interaction framework for the CALLP application 22 may be defined by selecting various ones of the collectables contained within the interaction provisioning module 32 for execution by the CALLP application 22. For example, a list of collectables and a sequence in which the collectables are to be executed may define the interaction framework for the CALLP application 22. Later, when the CALLP application 22 receives a request for connection between the originating station 12 and the terminating station 14, the CALLP 22 will interact with the OA 24 and/or the TA 26 in accordance with the defined interaction framework. In that the interaction between the CALLP application 22 and the OA 24/TA 26 may be comprised of any suitable combination of the various collectables maintained within the interaction provisioning module 32 and may be readily revised, for example, by modifying the list of selected collectables and/or sequence of execution for the selected collectables, the interaction framework provided to the CALLP application 22 is termed a "flexible" interaction framework. In one aspect thereof, the service provider, i.e., the owner/operator of the IXC switch 16, may modify the interaction framework using a user interface 38, coupled to the provisioning application 28, to add/delete provisioned collectables to/from the interaction provisioning module 32, to select/deselect provisioned collectables for the list, and/or modify the sequence of execution for the selected collectables. In another aspect, the interaction framework may be modified by the collectables themselves during the execution thereof.

Figure 2:
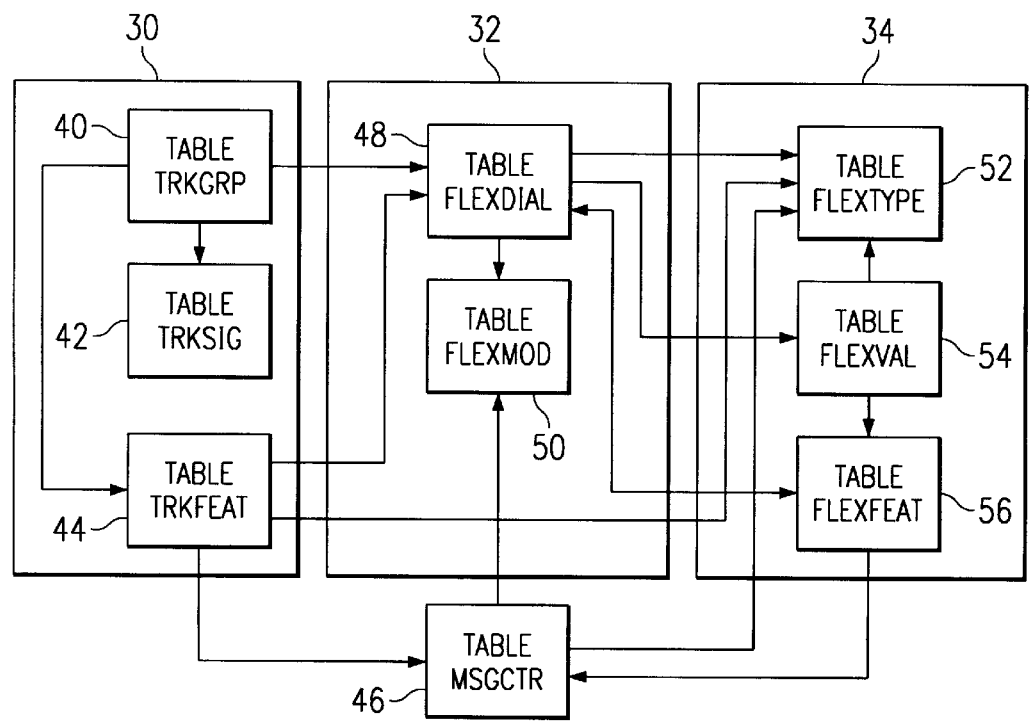
FIG. 2 is an expanded block diagram of resource, interaction and subscriber provisioning modules of the switching device of FIG. 1.

Referring next to FIG. 2, each of the resource, interaction, subscriber and translations provisioning modules 30, 32, 34 and 36 is comprised of a collection of tables, each of which maintains a respective type of provisioning information for the module. More specifically, provisioning information for the resource provisioning module 30 is maintained in table TRKGRP 40, table TRKSIG 42 and table TRKFEAT 44. The table TRKGRP 40, the table TRKSIG 42 and the table TRKFEAT 44 are respectively configured as follows:

TABLE TRKGRP

Key:
16 character string—defines a name for the TRKGRP table.
Fields:
TRAFSNO;
PADGRP;
NCCLS;
SELSEQ;
SIGIDX (a pointer to TABLE TRKSIG);
FEATIDX (a pointer to TABLE TRKFEAT);
DPIDX (a pointer to TABLE FLEXDIAL); and
OGRPTYP.

TABLE TRKFEAT

Key: 16 character string—defines a name for the TRKFEAT table entry.
Fields:
ORIGOPTS—vector of options applicable for originating agents; and
TERMOPTS—vector of options applicable for terminating agents.
Supported ORIGOPTS options are:
ALTTRTMT, ANSCDR, CAIN, CAINGRP, CDRTMPLT, CICRTE, CITYCODE, COSOVE, IECCLINX, MSGCTR, OHQ, REORIGAL, SNPA, SNXX, SUSTMR, TIMEBIAS, TRANSTS, TRKCOS and ZONE.
Supported TERMOPTS options are:
CAINGRP, CICDELV, NOANSDUR, OHQTERM, ONNETTRK, SNPA, SNXX, TRKCOS and ZONE.
The ORIGOPTS vector options:
ALTTRTMT—use ALTERNAT for TMTCNTL;
ANSCDR—generate a CDR on answer;
CAIN—enable CAIN services;
CAINGRP—use CAINGRP table index;
CDRTMPLT—use CDRTMPLT index for formatting CDR records;
CICRTE—support CIC routing;
CITYCODE—used with subscriber number CITYCODE validation and public speed dialing;
COSOVE—class of service override;
IECCLINX—incoming exclusion index;
MSGCTR—used to identify information for FLEXDIAL collectable processing;
OHQ—support off hook queuing.;
REORIGAL—allow reorigination on the trunk group;
SNPA—the originating NPA for the trunk group;
SNXX—the originating NXX for the trunk group;
SUSTMR—the suspend timer for suspend/resume capability;
TIMEBIAS—identifies the trunk group destination and switch are in different time zones;
TRANSTS—identifies STS used. May be overwritten by FLEXFEAT TRANSTS option for cal;
TRKCOS—identifies the TRKCOS index for screening; and
ZONE—identifies the ZONE value for looped back echo cancelers.
The TERMOPTS vector options:
CAINGRP—use CAINGRP table index;
CICDELV—support CIC delivery;
NOANSDUR—identifies the no answer duration timer (long call disconnect);
OHQTERM—supports off hook queuing as a terminating agent;
ONNETTRK—identifies the terminating trunk group as an on network trunk;
SNPA—the terminating NPA for the trunk group;
SNXX—the terminating NXX for the trunk group;
TRKCOS—identifies the TRKCOS index for screening; and
ZONE—identifies the ZONE value for looped back echo cancellers.

TABLE TRKSIG

Key:
16 character string—defines a name for the TRKSIG table entry.
Fields:
SIGTYPE {DS1, FXS, FXO, CCS7}.
For DS1, FXS and FXO SIGTYPEs:
ISTART—{IM, DD, WK, SZ} FOR ds1; {GS, LS} FOR FXS/FXO
IPULSETYP—{NP, MF, DTMF};
PSEIZTMR—1 to 30 seconds;
PDILTMR—1 to 30 seconds;
MINRTMR—1 to 30 seconds;
FDIGMASK—Only for MF pulsetype: set of {KP, KPP};
LDIGMASK—Only for MF pulsetype: set of {ST, STP, ST2P, ST3P};
DIGMASK—Only for DTMF pulsetype: set of {0–9, A, B, C, D, S, P};
TRMDIGIT—Only for DTMF pulsetype: {S,P};
DIALMODE—{C, M};
OSTARTG—{IM, DD, WK, SZ} for DS1; {GS, LS} for FXS/FXO;
OPULSTYP—{NP, MF, DTMF};
OIDGTMR—0 to 100 in 10 ms intervals; and
TRKGRDTM—{7 to 255}.
OPTIONS—Vector of PTS Signalling Options:
{ACKWINK, ALTSEIZ, ANSWFLTR, ATDANS, BCCOMPAT, CPIALLOW, DELIVER, DETDIAL, DIGSOUTP, ECSTAT, ESUPR, GLAREYD, IRINGCHK, MLTSGAGE, ODSCFLTR, ORIGFLTR, REMBSY, RETOFFHK and DSCFLTR}.
OPTIONS:
ACKWINK—For FGD protocol final acknowledgment wink;

ALTSEIZ—Identifies alternating AB bit seizure pattern for FXO signalling type;

ANSWFLTR—Filter for answer offhook detection;

ATDANS—Audio tone detector option for detecting software answer;

BCCOMPAT—Identifies the bearer channel compatibility for trunk group members;

CPIALLOW—For DAL protocol terminations, enables outpulsing of ANI digits;

DELIVER—For FGD protocol termination, identifies delivery of charge/calling party;

DETDIAL—Audio tone detector option for detecting dialtone as a proceed to send;

DIGSOUTP—For DAL protocol terminations, identifies max. num. of digits to outpulse;

ECSTAT—Enables echo cancellor (6X50EC);

ESUPR—Enables echo suppression;

GLAREYD—Identifies that trunk members yield in glare signalling situations;

IRINGCHK—identifies that the ringing signal must accompany an incoming seizure signal for the FXO signalling type;

MLTSGAGE—For FGD protocol terminations, enables multistage outpulsing;

ODSCFLTR—Filter for originating disconnect onhook detection;

ORIGFLTR—Filter for originating offhook detection;

REMBSY—Enables remote busy signalling indication;

RETOFFHK—Identifies when the answer signal is propagated to the originating switch; and TDSCFLTR—Filter for terminating disconnect onhook detection.

FIELDS: For CCS7 SIGTYPE:

PROTOCOL—{UCP};

ADJNODE—An existing entry into table ADJNODE;

ISUPIDX—{UCS2EAEP};

OPTIONS—Vector of CCS7 Signalling Options:

{ABCNTRL, BCCOMPAT, COT, DELIVER, ECSTAT, ESUPR, GLARE}.

Options:

ABCNTRL—Identifies if A-bit bearer channel control is active for trunk group members;

BCCOMPAT—Identifies the bearer channel compatibility for trunk group members;

COT—Identifies continuity testing requirements for the trunk group;

DELIVER—For FGD protocol terminations, identifies delivery of charge/calling party;

ECSTAT—Enables echo cancellor (6X50EC);

ESUPR—Enables echo suppression; and

GLARE—Identifies glare handling for trunk group members.

For the interaction module 32, provisioning information is maintained in table FLEXDIAL 48 and table FLEXMOD 50. The table FLEXDIAL 48 and the table FLEXMOD 50 are respectively configured as follows:

TABLE FLEXDIAL

Key—Supports 32696 (–32K) tuples;

24 character string—defines name for provisioned collectable list.

Fields:

OPTIONS—Vector of up to 4 collectables.

CONTINUE: {Y or N}—Continue this list into another tuple?

DPIDX (if CONTINUE=Y)—Identified FLEXDIAL table index for continuation of the collectable list.

List of available collectable primitives:

SIG, RCVSIG, SNDSIG, TERMINATE, APTRMT, SETTRMT, APRESET, GOTO, DO, INCLUDE, ROUTE, OM, IFDIGS, IFCNT, IFNOA, IFPARM, IFTRMT, IFTOD, IFPRMT, IFVAR, VAROP, ADDDIGS, DELDIGS, MODDIGS, COPYDIGS, MODNOA, AGNTDATA, COLDIG, COLPARM, SUBR, SUBRPARM, ADDR, ADDRPARM, CIC, CICPARM, OLI, OLIPARM, REPLDIG, CALLTYPE, CLRFTRS, SETTRANS.

SIG:

Preconditions: None.

Function: Modifies Inband Digit Collection Signaling. Parameters (Pulse type, timer values, etc.).

Effect: Immediate (Agent).

Side Effects: ACK/Alerting signals to be sent for DTMF transitioning. Cannot reset past SIG which transitions signaling or pulse type.

RCVSIG:

Preconditions: None.

Function: Reception of an identified signal within a specific time period. Failure may result in immediate treatment for call.

Effect: Immediate (Agent).

Side Effects: None.

SNDSIG:

Preconditions: None.

Function: Transmit an Identified signal.

Effect: Immediate (Agent).

Side Effects: Some signals may only be sent once. Agent incompatibility.

TERMINATE:

Preconditions: None.

Function: Transitions call through "Present Call" stage. May or may not continue collectable processing.

Effect: Immediate (CALLP).

Side Effects: Disables future inband digit collection (until release of terminator).

APTRMT:

Preconditions: "Delayed" treatment set for call.

Function: Abort remaining collectable execution if a treatment is currently set for the call. Nothing otherwise.

Effect: Immediate (CALLP).

Side Effects: None.

SETTRMT:

Preconditions: None.

Function: Sets a "delayed" treatment for the call.

Effect: Immediate (CALLP).

Side Effects: None.

APRESET:

Preconditions: "Delayed" reset activated by digit collectable for the call.

Function: Reset processing back to the digit collectable which generated the delayed reset validation failure action.

Effect: Immediate (Collectable Mgr, Digit Buffer, CALLP).

Side Effects: Whatever was done is undone in the reset action.

GOTO:
Preconditions: None.
Function: Modify collectable list—branch without return. Next collectable executed is first collectable for identified index.
Effect: Immediate (Collectable Mgr).
Side Effects: Collectables originally following GOTO never executed.

DO:
Preconditions: None.
Function: Modify collectable list—branch with return. The next collectable executed is first collectable of identified list. Once the "thread of execution: identified by the new list is complete, the collectable following the DO in the original list is executed.
Effect: Immediate (Collectable Mgr).
Side Effects: None.

INCLUDE:
Preconditions: None.
Function: Modify collectable list—insert into current list. The next collectable executed is the first collectable in the identified list. Remaining collectables from the original list are executed when reached.
Effect: Immediate (Collectable Mgr).
Side Effects: None.

ROUTE:
Preconditions: Treatment is not set for the call.
Function: Identifies the route for the call, bypassing need for translations.
Effect: Immediate (CALLP).
Side Effects: May override or be overridden by other mechanisms (ex: STDPRTCT S or T selector).

OM:
Preconditions: None.
Function: Increments a 32-bit OM register for a user defined FLEXDIAL OM tuple.
Effect: Immediate (OM).
Side Effect: OM tuples within the FLEXDIAL OM group are automatically created and destroyed through use of the OM collectable.

IFDIGS:
Preconditions: Digits available in Digit Buffer for comparison.
Function: Branch if received digits match identified pattern (or not). Performs collectable list modification on successful comparisons.
Effect: Immediate (Collectable Mgr).
Side Effect: List modify action may be INSERT, APPEND, REPLACE, or EXEC.

IFCNT:
Preconditions: Digits available in Digit Buffer for comparison.
Function: Branch if digit count (of digit buffer digits) is within identified range. Performs collectable list modification on successful comparisons.
Effect: Immediate (Collectable Mgr).
Side Effects: See IFDIGS.

IFNOA:
Preconditions: Calling or Called Party NOA currently identified.
Function: Branch if received nature of address matches identified value(s) (or not). Performs collectable list modification on successful comparisons.
Effect: Immediate (Collectable Mgr).
Side Effects: See IFDIGS.

IFPARM:
Preconditions: Receipt of out-of-band message for agent.
Function: Branch if identified parameter is present in message. Performs collectable list modification on successful comparisons.
Effect: Immediate (Collectable Mgr).
Side Effects: See IFDIGS.

IFTRMT:
Preconditions: A "delayed" treatment is set for the call.
Function: Branch if one of the identified treatments is set for the call. Performs collectable list modification on successful comparisons.
Effect: Immediate (Collectable Mgr).
Side Effects: See IFDIGS.

IFTOD:
Preconditions: Accurate system time.
Function: Branch if the system time is within one of the identified time periods. Performs collectable list modification on successful comparisons.
Effect: Immediate (Collectable Mgr).
Side Effects: See IFDIGS.

IFPRMT:
Preconditions: Recently applied prompt for the originating agent.
Function: Branch if one of the specified prompts is the last audible prompt applied for the agent. Performs collectable list modification on successful comparisons.
Effect: Immediate (Collectable Mgr).
Side Effects: See IFDIGS.

IFVAR:
Preconditions: Previously set one of new generic variables AVAR, BVAR, CVAR or DVAR using VAROP collectable.
Function: Branch if the specific expression using the identified variable is true. Performs collectable list modification on successful comparisons.
Effect: Immediate (Collectable Mgr).
Side Effects: See IFDIGS.

VAROP:
Preconditions: None.
Function: Perform specified operation on identified generic variable (either AVAR, BVAR, CVAR or DVAR). Supports new VAROP MSGCTR message.
Effect: Immediate (CALLP).

ADDDIGS:
Preconditions: None.
Function: Adds identified digits to digit buffer.
Effect: Immediate (Digit Buffer).
Side Effects: Cannot create "holes".

DELDIGS:
Preconditions: Digits available in Digit Buffer.
Function: Remove identified digits from Digit Buffer.
Effect: Immediate (Digit Buffer).
Side Effects: None.

MODDIGS:
Preconditions: Digits available in Digit Buffer.

Function: Uses digits in Digit Buffer to index table FLEXMOD. Digits provisioned in table FLEXMOD replace those used to index the table.

Effect: Immediate (Digit Buffer).

Side Effect: Cannot create "holes".

COPYDIGS:

Preconditions: Digits available in Digit Buffer.

Function: Makes a copy of digits currently in the buffer to another location in the buffer.

Effect: Immediate (Digit Buffer).

Side Effect: Cannot create "holes".

MODNOA:

Preconditions: None.

Function: Specify the calling or called party nature of address for the call.

Effect: Immediate (CALLP, CDR).

Side Effects: None.

AGNTDATA:

Preconditions: None.

Function: Retrieves agent related "digit" information from. TRKFEAT and adds these digits to the Digit Buffer.

Effect: Immediate (Digit Buffer).

Side Effects: None.

COLDIG

Preconditions: Digit Buffer cannot complete requirements; MSGCTR messages.

Function: Collects raw digit information from agent through inband collection.

Effect: Immediate (Agent, Digit Buffer).

Side Effect: No processing of received digits is performed.

COLPARM:

Preconditions: Digit Buffer cannot complete requirements; MSGCTR messages.

Function: Collects raw digit information from agent through out-of-band message parameters.

Effect: Immediate (Agent, Digit Buffer).

Side Effect: No processing of received digits is performed.

SUBR:

Preconditions: Digit Buffer; MSGCTR messages.

Function: Process received subscriber number digits using inband collection. Validation occurs through FLEXVAL/FLEXFEAT.

Effect: Immediate (Agent, Digit Buffer, Collectable Mgr, MSGCTR, CDR).

Side Effects: Digits may or may not be removed from Digit Buffer. Possibly post more messages to MSGCTR.

SUBRPARM:

Preconditions: Digit Buffer; MSGCTR messages.

Function: Process received subscriber number digits using out-of-band message parameters. Validation occurs through FLEXVAL/FLEXFEAT.

Effect: Immediate (Agent, Digit Buffer, Collectable Mgr, MSGCTR, CDR).

Side Effects: Digits may or may not be removed from Digit Buffer. Possibly post more messages to MSGCTR.

ADDR:

Preconditions: Digit Buffer; MSGCTR messages.

Function: Process received called party address digits using inband collection. Received digits screened through table STDPRTCT. Perform N00 TCAP application, speed dial number translation, UAX selector processing, etc. as required. Digits are consumed from the Digit Buffer.

Effect: Immediate (Agent, Digit Buffer, Collectable Mgr, MSGCTR, CDR). Validation treatments are delayed.

Side Effects: Need ADDR OPER MSGCTR message to properly handle operator calls. Special N00 Application may post MSGCTR messages related to overflow routing numbers.

ADDRPARM:

Preconditions: Digit Buffer; MSGCTR messages.

Function: Process received called party address digits using out-of-band message parameters. Received digits screened through table STDPRTCT. Perform N00 TCAP application, speed dial number translation, UAX selector processing, etc. as required. Digits are consumed from the Digit Buffer.

Effect: Immediate (Agent, Digit Buffer, Collectable Mgr, MSGCTR, CDR). Validation treatments are delayed.

Side Effects: Need ADDR OPER MSGCTR message to properly handle operator calls. Special N00 Application may post MSGCTR messages related to overflow routing numbers.

OLI:

Preconditions: Digit Buffer; MSGCTR messages.

Function: Process 1NX and ANI Information digits using inband collection. Received digits are screened through table STDPRTCT. Digits are consumed from the Digit Buffer.

Effect: Immediate (Agent, Digit Buffer, Collectable Mgr, CDR). Validation treatments are delayed.

Side Effects: INTOA or INTDD screened 1NX's effect ADDR collectable processing (i.e. pretranslations are not performed), and requires the use of SETTRANS to identify the translation system for these calls.

OLIPARM:

Preconditions: Digit Buffer; MSGCTR messages.

Function: Process 1NX and ANI Information digits using out-of-band message parameters. Received digits are screened through table STDPRTCT. Digits are consumed from the Digit Buffer.

Effect: Immediate (Agent, Digit Buffer, Collectable Mgr, CDR). Validation treatments are delayed.

Side Effects: INTOA or INTDD screened 1NX's effect ADDR collectable processing (i.e., pretranslations are not performed), and requires the use of SETTRANS to identify the translation system for these calls.

CIC:

Preconditions: Digit Buffer; MSGCTR messages.

Function: Process received CIC digits using inband collection. Received digits are used to index tables TRK4CIC and CICROUTE for applicable features, and potentially table OPERRTE for operator service calls. Digits are consumed from the Digit Buffer.

Effect: Immediate (Agent, Digit Buffer, MSGCTR, CDR).

Side Effects: CICROUTE.

CICPARM:
  Preconditions: Digit Buffer; MSGCTR messages.
  Function: Process received CIC digits using out-of-band message parameters. Received digits are used to index tables TRK4CIC and CICROUTE for applicable features, and potentially table OPERRTE for operator service calls. Digits are consumed from the Digit Buffer.
  Effect: Immediate (Agent, Digit Buffer, MSGCTR, CDR).
  Side Effects: CICROUTE.
REPLDIG:
  Preconditions: Digit Buffer; MSGCTR messages.
  Function: Request raw digit information to replace digits currently in the Digit Buffer, using inband digit collection as required. Received digits simply replace those in the Digit Buffer.
  Effect: Immediate (Agent, Digit Buffer).
  Side Effects: No other processing is performed on the digits received. Cannot create "holes". No out-of-band version.
CALLTYPE:
  Preconditions: MSGCTR messages.
  Function: Apply features and characteristics identified by the specified FLEXTYPE and FLEXFEAT indices to the call.
  Effect: Immediate (CALLP, Collectable Mgr, MSGCTR, CDR).
  Side Effects: Features applied simply due to "flow" of FlexDial execution.
CLRFTRS:
  Preconditions: None.
  Function: Resets or defaults features and characteristics for call. Provides mechanism to "turn off" features that had been "turned on."
  Effect: Immediate (CALLP).
  Side Effects: Resetting "called party billed" restores CDR Billnum field.
SETTRANS:
  Preconditions: None.
  Function: Identifies translation system for call. May override/be overridden by other mechanisms performing this purpose (ex: STDPRTCT NT selector).
  Effect: Immediate (CALLP).
  Side Effects: None.
TABLE FLEXMOD
  Key—Supports a maximum of 12 million tuples;
  A: String Index—16 character string defines names for FLEXMOD index.
  B: Digits—A vector of up to 16 digits representing the digits that are to be replaced.
  Fields:
    FMLTVEC—Vector of up to 16 digits representing the replacement digits.
    Used exclusively by the MODDIGS collectable.

The subscriber provisioning module 34 maintains subscriber database information for the IXC switch 16. This information includes the identification of subscriber number types, the identity of subscriber numbers and their associated profiles. For the subscriber provisioning module 34, provisioning information is maintained in table FLEXTYPE 52, table FLEXVAL 54 and table FLEXFEAT 56. The table FLEXTYPE 52 defines subscriber number types and type associated features. The table FLEXVAL 54 is used for validation of all received subscriber numbers and identifies the profile of the subscriber number. The table FLEXFEAT 56 defines the profile or the features and characteristics of the subscriber number. The table FLEXTYPE 52, the table FLEXVAL 54 and the table FLEXFEAT 56 are respectively configured as follows:

TABLE FLEXTYPE
  Key—Supports 1024 FLEXTYPE definitions:
  16 character string—defines name for subscriber number type.
  Fields:
    OPTIONS—vector of subscriber number type options.
  Supported options for subscriber number types include:
    {ANSCDR, BILLFLD, BILLFLGS, CAINFLG, CALLING, CDRTMPLT, EMPTYIDX, FLEXLOG, OPERDISP, REVALIDATE}:
    ANSCDR—Enables generation a CDR when answer occurs for the call.
    BILLFLD—Identifies the billing record field used to record subscriber number digits received for this type of subscriber number.
    BILLFLGS—Identifies value to capture in the new CALLTYPE filed of the CDR.
    CAINFLG—Determines the method of CAIN subscription.
    CALLING—Identifies subscriber numbers using this type as calling party subscriber numbers.
    CDRTMPLT—Identifies the template to use for formatting the CDR generated at call disconnect.
    EMPTYIDX—Identifies that validation is successful for screening attempts against an empty FLEXVAL numeric index.
    FLEXLOG—Causes a log to be generated when validation failures occur for a subscriber number.
    OPERDISP—Identifies how subscriber numbers of this type are to be displayed on the operator screen for calls connecting to an EOP operator.
    REVALIDATE—On reoriginated calls, the received subscriber number digits are revalidated.
TABLE FLEXVAL
  Key—Supports 33.5M table entries (theoretical—memory limitations)
    FLEXTYPE table entry
    Numeric index {0 to 1,047,999}
    Subscriber number digits (up to 16 digits)
  Fields:
    FEATIDX—Identifies an index into table FLEXFEAT which identifies the features and characteristics of the subscriber number.

The FLEXVAL table uses a balanced tree structure (AVL or BTREE) algorithm in order to optimize the trade-off between data store used and real-time lookup cost ($\log_2(n)$).
TABLE FLEXFEAT
  Key—Supports 16M entries (theoretical—memory limitations)
  Numeric value—{0 to 16,777,215}
  Fields:
    OPTIONS—vector of subscriber number options which identify the features and characteristics of the subscriber number.
  Supported options for subscriber numbers include:
    ANSCDR, BCCOMPAT, CAINGRP, CASUAL, CDRTMPLT, CITYCODE, CITYVAL, CLDPBILL, DELIVER, DPIDX, FAILVAL, FLDONLY, GENLOG, MLTCOSID, MSGCTR, NOANSDUR, ONNET, PVSPDIDX, REORGACT, REORGTYP, REVALIDATE, SPLASHBK, TCAPANNC, TRANSTS ANSCDR—Generates a CDR when answer occurs for the call.

BCCOMPAT—Identify bearer compatibility for the call.

CAINGRP—Index into the CAINGRP table for carrier AIN (UCS07+).

CASUAL—Identifies the subscriber number as a casual subscriber number.

CDRTMPLT—Identify the template to use for formatting the CDR.

CITYCODE—Used in citycode validation and public speed dialing.

CITYVAL—Used to identify requirement for CITYCODE validation.

CLDPBILL—Identifies the call as called party billed.

DELIVER—Calling party number delivery option.

DPIDX—Specifies FLEXDIAL table index used to modify the interaction with the originating agent.

FAILVAL—Indicates that a failure result occurs for the validation attempt.

FLDONLY—Indicates that the processed subscriber number digits must be FILED digits.

GENLOG—Causes a log to be generated when the subscriber number is used.

MLTCOSID—Multiple class of service screening index.

MSGCTR—Mechanism to identify subscriber specific information for interaction processing.

NOANSDUR—No answer duration feature (long call disconnect).

ONNET—Identifies the call as an on-network call.

PVSPDIDX—Private speed dial index.

REORGACT—Reorigination action when reorigination occurs.

REORGTYP—Reorigination type identifying how reorigination may be triggered.

REVALIDATE—On reoriginated calls, the subscriber number is revalidated.

SPLASHBK—Apply identified splash back tone when a treatment tone is applied to the call.

TCAPANNC—Identifies an index into the TCAPANNC table for the N00 TCAP Application.

TRANSTS—Identifies the STS to use for the call.

Subscriber number provisioning may optionally use the table FLEXDIAL 48 (of the interaction provisioning module 32) to identify modifications to the interaction being processed on a subscriber number basis and/or the table MSGCTR 46 to override specific aspects of the interaction being processed.

Finally, each of the selectable components of the translation provisioning module 36 are conventionally configured and need not be described in greater detail than that already provided.

A series of pointers couple selected ones of the tables maintained by the resource, interaction and subscriber modules 30, 32 and 34 to tables maintained by the same or different ones of the resource, interaction and subscriber modules 30, 32 and 34. More specifically, the table TRKGRP 40 of the resource provisioning module 30 points to the tables TRKSIG 42 and TRKFEAT 44 of the resource provisioning module 30 and table FLEXDIAL 48 of the interaction provisioning module 32. In turn, the table TRKFEAT 44 points to the table FLEXDIAL 48 of the interaction module 32 and the table FLEXTYPE 52 of the subscriber provisioning module 52. For the interaction provisioning module 32, the table FLEXDIAL 48 points to the table FLEXMOD 50 (also maintained within the interaction provisioning module 32) and the tables FLEXTYPE and FLEXVAL 52 and 54 of the subscriber provisioning module 34.

Finally, within the subscriber provisioning module 34, the table FLEXVAL 54 points to the table FLEXFEAT 56 and the table FLEXTYPE 52. By interconnecting the various tables of the resource, interaction and subscriber provisioning modules 30, 32 and 34 in this manner, the various components used by the provisioning application 22 to define the interaction framework for the CALLP application 22 may be more readily retrieved. Furthermore, by cross-connecting the various provisioning modules in the described manner, the resource and interaction provisioning modules 30 and 32 may use information maintained in others of the provisioning modules when providing the provisioning application 28 with resource, and interaction provisioning information. By maintaining a portion of the information needed for resource and interaction provisioning of the CALLP application 22 in another provisioning module, the size of the resource and interaction provisioning modules 30 and 32 may be reduced.

Table MSGCTR 58 is shared by the resource, interaction and subscriber provisioning modules 30, 32 and 34. Through use of a MSGCTR option for either the FLEXFEAT and TRKFEAT table 44 or 56, an index into the table MSGCTR 58 is identified which contains a list of data/information messages posted thereat.

The table MSGCTR 46 is configured as follows:

TABLE MSGCTR:

Key

Numeric value—{0 to 16M}

Fields:

ADDRESSEE—vector of up to 20 messages

A message consists of three main parts:

Addressee (Who (what collectable) the message is for);

Message Type (What the message is about); and

Data (specific information related to the message type).

Messages and message types defined through the MSGCTR table are currently supported for:

COLDIG/COLPARM collectables: FILED, PROMPT, MINMAX messages;

SUBR/SUBRPARM collectables: for specific FLEXTYPE FILED, PROMPT, MINMAX, MATCH, and INDEXES messages;

ADDPJADDRPARM collectables: FILED, PROMPT, MINMAX, OPER, and PRTNM messages;

OLI/OLIPARM collectables: FILED, PROMPT, PRTNM messages:

REPLDIG collectable: FILED, PROMPT, MINMAX messages:

MODDIGS collectable: INDEX message; and

VAROP collectable: VALUE message.

Referring next to FIG. 3, a method of provisioning the CALLP application 22 of the IXC switch 16 with a flexible interaction framework in accordance with the teachings of the present invention will now be described in greater detail. In its broadest sense, a flexible interaction framework is constructed, for example, by a system administrator at the user interface 38 reviewing the contents of the various provisioning modules 30, 32, 34 and 36 and constructing a flexible interaction framework by selecting desired components, for example, software scripts, from the provisioning modules 30, 32, 34 and 36. Later, when the CALLP module 22 is handling a call, the provisioning module 28 will provide the CALLP module 22 with an interaction framework, i.e., the collection of selected scripts, for handling interactions with the OA 24 at the originating station 18 and the TA 26 at the terminating station 20 necessary to setup and route a call therebetween. It should be understood that, for ease of description of the present invention, those portions of the provisioning process deemed conventional have been simplified and/or omitted from the description which follows.

Referring next to FIG. 3, the method of selectively provisioning the IXC switch 16 commences at step 60 and, at step 62, resource provisioning of the IXC switch 16 is commenced. The foregoing method of resource provisioning is a software-implemented technique in which, by appropriate selection of various software scripts respectively provided as components of the resource provisioning module 30, a unique software-based trunk group capable of mimicking selected ones of the various hardcoded interaction protocols presently in use, including DAL, EDAL, FGA, FGB, FGC, and FGD, is constructed. At step 64, the trunk group is defined by selecting desired ones of the scripts maintained by the table TRKGRP 40 of the resource provisioning module 30. More specifically, to define the trunk group, a system administrator at the user interface 38 reviews the contents of the table TRKGRP 40 of the resource provisioning module 30 and selects, from the table TRKGRP 40, desired ones of the scripts contained therein.

The method proceeds to step 66 where signalling related information is provisioned by selecting scripts from the table TRKSIG 42 of the resource provisioning module 30, again by a system administrator at the user interface 38. In similar fashion, at step 68, features and characteristic information of the trunk group is provisioned by selecting scripts from the table TRKFEAT 40. Proceeding on to step 70, trunk group related interaction characteristics are provisioned by selecting scripts from the table FLEXDIAL 48 of the interaction provisioning module 32 and, at step 72, overrides of interaction characteristics on a trunk group basis are provided by selecting scripts from the table MSGCTR 48, thereby completing resource provisioning at step 74.

An example of resource provisioning conducted in accordance with the above-described method is as follows:

```
TRKGRP
    ACC670TWMFWK
        GRPTYP: AXXESS
        TRAFSNO: 9
        PADGRP: NDPGP
        NCCLS: NCIT
        SELSEQ: MIDL
        SIGIDX: MF_WK_IDX
        FEATIDX: AXX670_IDX
        DPIDX :  L_OLI_ANI_CV
                 ITC_AU_SD_AD
        OGRPTYPE: EANT
TRKFEAT
    AXX670
        ORIGOPTS:    (ALTTRTMT) (OHQ) (REORIGAL $)
                     (SNPA 214) (SNXX 684) (TIMEBI8AS -2)
                     TRKCOS 6) (MSGCTR 670)$
        TERMOPTS:    (NOANSDUR 10 TRMT RODR)
                     (OHQTERM) SNPA 703) (TRKCOS 6)$
MSGCTR
    670
        ADDRESS:     (ADDR PRTNM EAN)
                     (OLI PRTNM EAPT) (ADDR OPER
                     NORMAL OFRT 1 EAN OFRT 2)$
TRKSIG
    MF_WK_IDX
        SIGTYPE: DS1
        IPULSETYP: MF
        ISTARTSG: WK
        PSEIZTMR: 5
        PDILTMR: 5
```

-continued

```
        MINRTMR: 2
        FDIGMASK: KP
        LDIGMASK: ST STP ST2P ST3P
        DIALMODE: M
        OSTARTSG: WK
        OPULSETYP: MF
        OIDGTMR: 6
        TRKGRDTM: 70
        OPTIONS:     (ANSWFLTR 16)
                     (DELIVER CGNONLY) (ACKWINK)
                     (MLTSTAGE) (ODSCFLTR 16)
                     (ORIGFLTR 7) (REMBSY)
                     (TDSCFLTR 16)$
```

After completing resource provisioning at step 74, the method proceeds to step 76 where subscriber provisioning of the IXC switch 16 is commenced. The foregoing method of subscriber provisioning is a software-implemented technique in which, unlike prior implementations, incoming subscriber numbers provided by originating stations are treated by the CALLP application 22 as generic subscriber numbers. Upon receipt of a subscriber number from an originating station, the CALLP application 22 uses the subscriber number provisioning included in the flexible interaction framework to identify the subscriber number. By providing subscriber number provisioning as part of a flexible interaction framework, the capabilities of the IXC switch 16 are greatly enhanced. For example, the IXC switch 16 may be readily reprogrammed to accept a new, previously unprovisioned, type of subscriber number.

At step 78, subscriber number types are provisioned by defining their namespace through the table FLEXTYPE 52 of the subscriber resource provisioning module 34. Proceeding on to step 80, new subscriber numbers are defined (or "validated") by selecting scripts from the table FLEXVAL 54 of the subscriber resource provisioning module 34. At step 82, feature profiles for the validated subscriber numbers are provisioned by selecting scripts from the table FLEXFEAT 56 of the subscriber resource provisioning module 34. Proceeding on to step 84, subscriber related interaction characteristics are provisioned by selecting scripts from the table FLEXDIAL 48 of the interaction provisioning module 32 and, at step 86, overrides of interaction characteristics on a subscriber number basis are provided by selecting scripts from the MSGCTR table 46, thereby completing subscriber provisioning at step 88.

An example of subscriber provisioning conducted in accordance with the above-described method is as follows:

```
FLEXTYPE
    AUTH
        OPTIONS:     (BILLFLD BILLNUM) (CDRTMPLT
                     AUTHAXXTMPLT N) (FLEXLOG)$
    ACCT
        OPTIONS:     (BILLFLD ACCTCD) (FLEXLOG)$
FLEXVAL
    AUTH 1 6841000
           FLEXFEAT: 10055
    ACCT 10055 12345678
           FLEXFEAT: 0
FLEXFEAT
    0
           OPTIONS:    $
    10055  OPTIONS:    (CITYCODE214) (ML'TCOSID 5)
                       (DPIDX L_AC_V_CPR APPEND)
                       (GENLOG) (MSGCTR 10055)
                       (PVSPDIDX 51) (REORGACT L_
```

-continued

```
REO_AD_SD_AC_V_CPR 0 15)
(REORGTYP ONKEY STR 2 20 5)
(TRANSTS STS 101)$
```

After completing subscriber provisioning at step 88, the method proceeds to step 90 where interaction provisioning of the IXC switch 16 is commenced. The foregoing method of interaction provisioning is a software-implemented technique in which the interaction between the CALLP application 22 and the OA 24 is defined by selecting a series of primitive instructions hereinafter referred to as collectables. When an initiated call enters the collect information point, the CALLP application 22 executes, in sequence, each of the selected collectables in the same order in which they were provisioned. As each collectable is datafilled with all of the information needed in order to completely executed, each collectable is a self-contained unit capable of executing autonomously. Execution of each of the selected collectables enables the CALLP application 22 to collect, from the OA 24, the information identified therein.

At step 92, the interaction between the CALLP application 22 and the OA 24 is defined by selecting collectables from the table FLEXDIAL 48 and the table FLEXMOD 50 of the interaction provisioning module 32. In this regard, it should be noted that the table FLEXMOD 50 can only be used through the MODDIGS collectable. As previously mentioned, each collectable contains a series of instructions which collectively provides a specific and contained service or function. The series of instructions contained in the collectable are executed sequentially when the collectable is processed during a "collect information" point in a call. Proceeding on to step 94, the sequence of execution for the selected collectables is selected. Generally, collectables are executed in the order that they are selected. An example of interaction provisioning in accordance with the above-described method is as follows:

I_AU_SD_AD (INCLUDED I_AUTH_SD) $ Y C_ADDR
I_AUTH_SD
(SUBR 5 7 AUTH Y N (PROMPT TONE STD SD 255 N)$
(VALIDATE INSWITCH FLEXVAL (1 7) $ TRMT Y INAU)
(RESET S 255 RODR PROMPT PREPRMPT $)$)$ N
C_ADDR
(ADDR 1 18 (SIGFEAT 2 0 2) $ (VALIDATE INSWITCH NPRT IGNORE)
(RESET S 255 RODR NOPROMPT PREVIOUS $)$)$ N

Interaction provisioning then ends at step 96 and the method of provision ends at step 98.

Once provisioning is complete, a list of the scripts selected from the resource, interaction, subscriber and translations modules 30, 32, 34 and 36 is maintained at a location where the list may be readily accessible to the CALLP application 22 upon a detection of an origination of a call. A sequence of execution for the selected interaction collectables is also maintained. Alternately, it is contemplated that the list may be maintained directly by the CALLP application 22 or by the provisioning application 28. If maintained by the provisioning application 28, a copy should be supplied to the CALLP application 22 upon a detection of an origination of a call.

Referring next to FIGS. 4a–f, the execution of the provisioned collectable list shall now be described in greater detail. As previously set forth, the execution of collectables occurs during call processing, for example, during the processing of a request, issued by the OA 24, for connection with the TA 26 will now be described. More specifically, the provisioned collectables sequentially execute during the "collect information" where the CALLP application 22 interacts with the OA 24 to collect information related to the requested connection. Unlike prior call processing techniques in which the interaction would have been pre-defined and hardcoded into the IXC switch 16, in accordance with the present invention, the interaction is defined by the sequential execution of the previously provisioned collectables. Indeed, the sequence of execution of the collectables may be modified during the execution itself.

Upon commencing the "collect information" step of call processing, the CALLP application 22, either alone or in conjunction with the provisioning application 28, creates a CALLP collectable version of the provisioned collectables maintained in the interaction module 32 and retrieves data for the provisioned collectables from the interaction module 32. Preferably, a collectable manager 98 residing within the CALLP application 22 or provisioning application 28 which also maintains the list of provisioned collectables selected for execution and the sequence of execution, retrieves the data from the interaction module 32. When executed, each collectable checks the table MSGCTR for messages, retrieves the messages and, if requested, will use the information contained therein to overwrite certain provisioned collectable data.

Figure 4A:
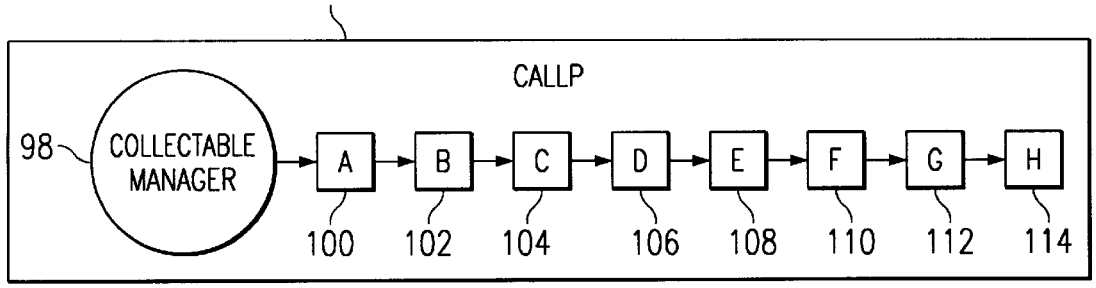
FIG. 4a illustrates an exemplary original collectable list.

FIG. 4a shows a series of collectables 100 through 114 after retrieval from the interaction module 32 and arranged in a sequence for execution. The illustrated sequence is produced if the entries placed in the table FLEXDIAL 48 during provisioning is as follows:

FLEXDIAL Table Entries:
Index1: (A) (B) (C) (D) $ Y INDEX2
Index2: (E) (F) (G) (H) $ N The collectable manager 98 then executes the collectables 100, 102, 104, 106, 108, 110, 112 and 114 in the indicated sequence of execution. For each to –10 collectable that executes, a specific and contained service or function is performed. By performing the contained service or function, some portion of the interaction between the CALLP application 22 of the IXC switch 16 and the OA 24 is executed. Thus, for the example illustrated in FIG. 4a, the interaction between the CALLP application 22 and the OA 24 is comprised of services A through H. The particular portion of the interaction accomplished by execution of a selected collectable is set forth in the description of primitives previously set forth.

In accordance with one aspect of the disclosed method of defining the interaction between the CALLP application 22 and the OA 24, the collectable list such as the list illustrated in FIG. 4a, may be modified during execution of the collectables. By modifying the collectable list being processed, the interaction between the CALLP application 22 and the OA 24 is also modified. To modify the collectable list, the executing collectable must include a triggering mechanism which causes the executing collectable to perform a specified action, typically, a branching of the sequence of execution in a specified manner. Collectables which contain a trigger which causes an unconditional branching of the sequence of execution are the DO, INCLUDE and GOTO collectables. When these collectables are executed, the sequence of execution will be branched in a manner specified within the collectable. Collectables which contain a trigger which causes a conditional branching of the sequence of execution are the IFDIGS, IFCNT, IFNOA, IFPARM, IFTRMT, IFTOD, IFPRMT and IFVAR.

When these collectables are executed, the sequence of execution will be branched in a manner specified within the collectable if a condition, also specified within the collectable, has been met.

While various types of modifications of the collectable list are possible, it is presently contemplated that the collectable list may be modified during execution of a collectable by the following actions:

1) REPLACE—replacing the remainder of the current list following the executing collectable with a new list;
2) APPEND—appending a new list to the end of the current list;
3) INSERT—inserting a new list between the executing collectable and a next collectable on the current list; and
4) EXECUTE—executing a new list as a subroutine and returning to a next collectible in the current list after the subroutine has been completed. Collectables containing a conditional trigger which initiates a sequence of execution modifying action if a specified condition has been met may be used to trigger the REPLACE, APPEND, INSERT or EXECUTE actions. Collectables containing a trigger which unconditionally initiates a sequence of execution modifying action may be used to trigger the REPLACE, INSERT and EXECUTE actions.

Figure 4B:
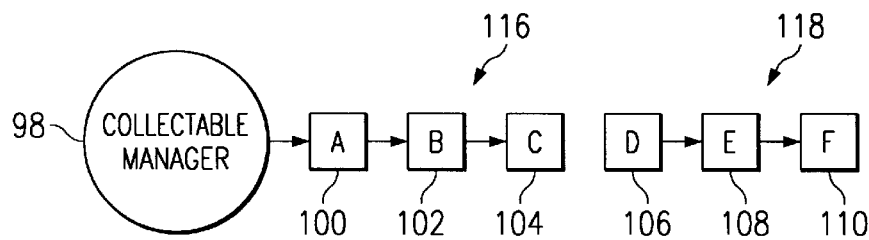
FIG. 4b illustrates simplified original and next collectable lists.

Referring next to FIGS. 4b–4g, the execution of a collectable which contains each of these actions shall now be described in greater detail. FIG. 4b illustrates a highly simplified interaction provisioning for the IXC switch 16. A current collectable list 116 is comprised of the collectables 100, 102 and 104. During the "collect information" step of call processing, the collectable manager 98 will execute, in sequence, the collectables 100, 102 and 104. The collectable manager 98 also maintains a next collectable list 118 comprised of the collectables 106, 108 and 110. The next collectable list is not, however, scheduled for execution during the "collect information" step.

Figure 4D:
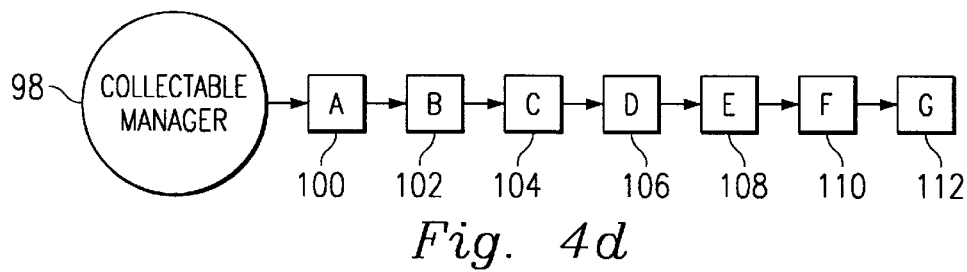
FIG. 4d illustrates the original and next collectable lists of FIGS. 4a–b after execution of an APPEND action.
Figure 4E:
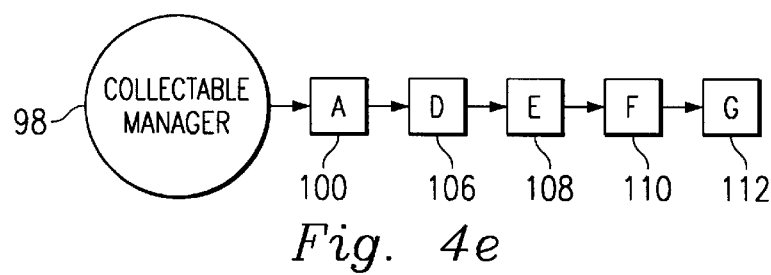
FIG. 4e illustrates the original and next collectable lists of FIGS. 4a–b after execution of REPLACE and APPEND actions.
Figure 4F:
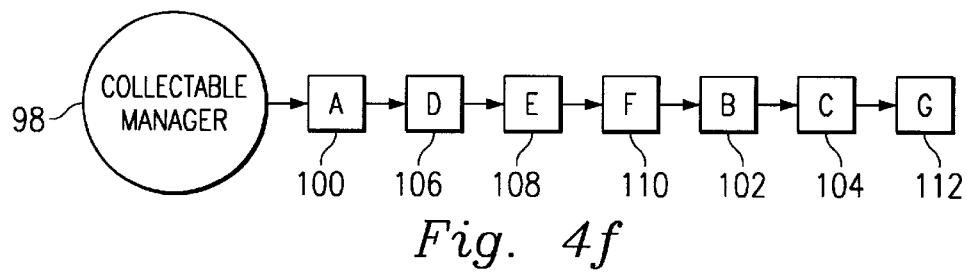
FIG. 4f illustrates the original and next collectable lists of FIGS. 4a–b after execution of INSERT and APPEND actions.
Figure 4C:
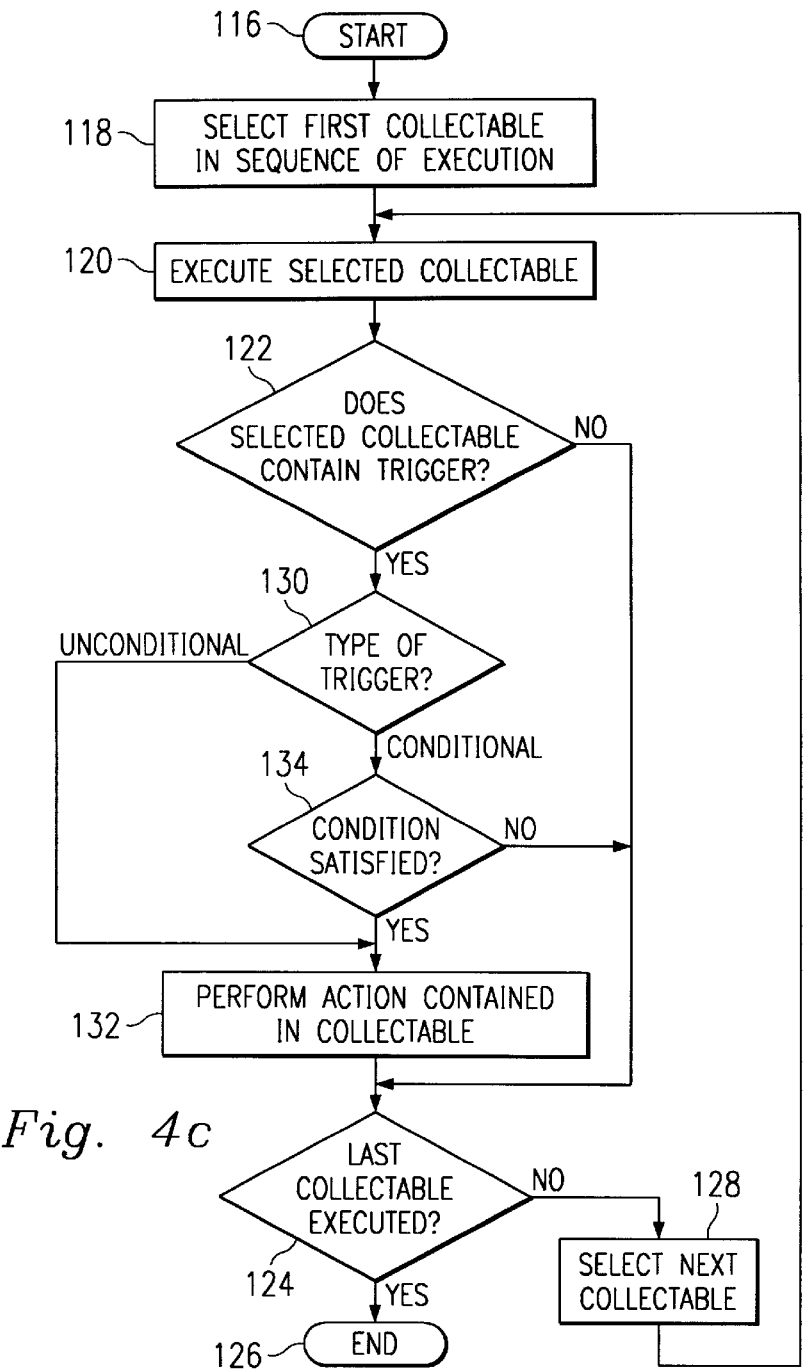
FIG. 4c is a flow chart of a method of triggering an action in response to execution of a collectable.

FIG. 4c illustrates a method of triggering an action in response to execution of a collectable. The method commences at step 116 and, at step 118, the collectable manager 98 selects a first collectable, for example, the first collectable 100 from a sequence of execution, for example, the sequence of execution 116. Proceeding on to step 120, the collectable manager 98 executes the selected collectable to perform a specified function. The selected collectable and associated specified function executed by the collectable manager 98 may be any of the SIG, RCVSIG, SNDSIG, TERMINATE, APTRMT, SETTRMT, APRESET, GOTO, DO, INCLUDE, ROUTE, OM, IFDIGS, IFCNT, IFNOA, IFPARM, IFTRMT, IFTOD, IFPRMT, IFVAR, VAROP, ADDDIGS, DELDIGS, MODDIGS, COPYDIGS, MODNOA, AGNTDATA, COLDIG, COLPARM, SUBR, SUBRPARM, ADDR, ADDRPARM, CIC, CICPARM, OLI, OLIPARM, REPLDIG, CALLTYPE, CLRFTRS OR SETTRANS collectable types and associated functions previously defined herein. Of course, the foregoing list of defined collectable types and associated functions is purely exemplary and the selected collectable types and associated functions performed upon execution thereof may be collectable types and/or functions other than those specifically enumerated herein.

Proceeding on to step 122, a determination is made as to whether the selected collectable contains a trigger, either conditional or unconditional which will cause the collectable to perform an action which modifies the sequence of execution. In the embodiment of the invention disclosed herein, each one of the available collectables will, based on upon its collectable type, either: (1) contain a conditional trigger; (2) contain an unconditional trigger; or (3) not contain a trigger. Specifically, the collectable types DO, INCLUDE and GOTO always contain an unconditional trigger, the collectable types IFDIGS, IFCNT, IFNOA, IFPARM, IFTRMT, IFTOD, IFPRMT, IFVAR, SUBR, SUBRPARM, CALLTYPE, ADDR, ADDRPARM, OLI and OLIPARM always contain a conditional trigger and the remaining collectable types do not contain a trigger. Of course, it is fully contemplated that, in an alternate embodiment of the invention, triggers may be placed in any or all of the available collectables contained in a sequence of execution, independent of collectable type.

Accordingly, from step 122, if the selected collectable being executed is of a collectable type that does not contain a trigger, the method proceeds to step 124 where the collectable manager 98 determines if the last collectable in the sequence of execution 116 has been executed. If the last collectable has been executed, the method ends at step 126. If, however, there are unexecuted collectables remaining in the sequence of execution, the method proceeds to step 128 where the next collectable in the sequence of execution is selected and the method returns to step 120.

Returning to step 122, if the selected collectable contains a trigger, the method proceeds to step 130 where a determination is made as to whether the trigger is a conditional or unconditional trigger. As before, trigger type is determined based upon the type of collectable being executed. If the trigger type is unconditional, the method proceeds to step 132 where the collectable manager 98 performs the action contained in the collectable and triggered by the collectable. By performing the action, the sequence of execution is modified. The method would then continue on to step 124 and proceed in the manner previously described.

If, however, it is determined at step 122 that the trigger type is conditional, the method proceeds to step 134 where it is determined if the condition contained in the collectable has been satisfied. If the condition has been satisfied, the method proceeds to step 132 and continues in the manner previously described. If, however, the condition has not been satisfied, the method proceeds to step 124 and continues from there in the manner previously described.

Referring now to FIG. 4d, an example of the APPEND action will now be described in greater detail. For this example, the original and next collectable lists are the original and next collectable lists 116 and 118 illustrated in FIG. 4b. The collectable 100 contains an APPEND action, specifically, an instruction to append the next collectable list 118 to the original collectable list 116. Accordingly, when the collectable 100 is executed, the next collectable list 118 is appended to the end of the original collectable list 116. Thus, by execution of the collectable A, the original collectable list 116 has been modified to comprise, in sequence of execution, the collectables 100, 102, 104, 106, 108 and 110. Later, when the collectable 108 is executed as part of the modified original collectable list 116, the collectable 112 is appended to the end of the modified original collectable list 116. Thus, the original collectable list 116 now contains, in sequence of execution, the collectables 100, 102, 104, 106, 108, 110 and 112.

Referring next to FIG. 4e, an example of the REPLACE action will now be described in greater detail. Again, in this example, original and next collectable lists are the original and next collectable lists 116 and 118 illustrated in FIG. 4b. In this example, the collectable 100 contains a REPLACE action, specifically, an instruction to replace the remainder of the original collectable list 116 with the next collectable list 118. The collectable 108 contains an APPEND action, specifically, an instruction to append the collectable 112 to the end of the next collectable list 118. Thus, by execution of the collectable A, the collectables 102 and 104 are removed from the original collectable list 116 and the next collectable list 118 is added to the original collectable list 116. Thus, after completing execution of the collectable 100, the collectable manager then executes, in sequence, the collectables 106, 108 and 110. Since the collectable 108 contains an APPEND instruction, execution of the collectable 108 causes the collectable 112 to be attached to the end of the modified original collectable list. Accordingly, after the collectable 110 is executed, the collectable manager 98 will then execute the collectable 112. Even though they are on the original list, collectables 102 and 104 are never executed.

Referring next to FIG. 4f, an example of the INSERT action will now be described in greater detail. Again, in this example, original and next collectable lists are the original and next collectable lists 116 and 118 illustrated in FIG. 4b. In this example, the collectable 100 contains an INSERT action, specifically, an instruction to insert the next collectable list 118 into the original collectable list 116. The collectable 108 contains an APPEND action, specifically, an instruction to append the collectable 112 to the end of the next collectable list 118. As execution of the collectable 100 causes the collectable manager 98 to insert the collectables 106, 108 and 110 into the original collectable list 116, after executing the collectable 100, the collectable manager 98 will then execute, in sequence, the collectables 106, 108, 110, 102 and 104. As the collectable 108 contains an APPEND command, the collectable 112 is then attached to the end of the list being executed. Thus, the collectable 112 executes after the collectable 104.

Figure 4G:
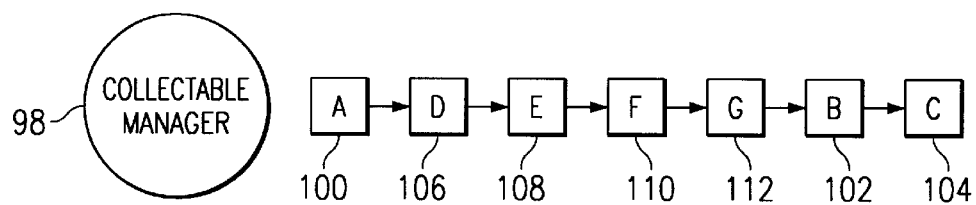
FIG. 4g illustrates the original and next collectable lists of FIGS. 4a–b after execution of EXECUTE and APPEND actions.

Referring next to FIG. 4g, an example of the EXECUTE action will now be described in greater detail. Again, in this example, original and next collectable lists are the original and next collectable lists 116 and 118 illustrated in FIG. 4b. In this example, the collectable 100 contains an EXECUTE action, specifically, an instruction to cause the next collectable list 118 to be formed and, upon formation of the next collectable list 118, to branch branches to the next collectable list 118. In accordance with the EXECUTE action, when the thread of execution of the next collectable list 118 is exhausted, i.e., the last collectable of the next collectable list has been executed, processing returns to the original collectable list 116 where the remaining collectables on the original collectable list 116 are executed. In further accordance with this example, the collectable 108 again contains an APPEND action, specifically, an instruction to append the collectable 112 to the end of the next collectable list 118. The resultant order of execution is shown in FIG. 4g. Specifically, the collectable manager 98 will first execute the collectable 100 from the original collectable list 116, branch to the next collectable list, execute the collectables 106 and 108. By executing the collectable 108, the collectable 112 is appended to the end of the next collectable list 118. The collectable manager 98 will then execute the collectables 110 and 112. The thread of execution of the next collectable list 118 being exhausted, the collectable manager 98 will then return to the original collectable list to execute the collectables 102 and 104. As may be noted, the result of performing an APPEND action after an EXECUTE action differs somewhat than the result of performing the APPEND action after an INSERT action described with respect to FIG. 4f. Specifically, as the INSERT action inserts the new list into the original collectable list 116, the APPEND action adds the collectable 112 to the end of the original collectable list 116. In contrast, the EXECUTE action causes a branching to the next collectable list 118. As a result, the APPEND action causes the collectable 112 to be added to the end of the next collectable list 118 and before a return to the unexecuted collectables of the original collectable list 116.

In the foregoing disclosure, the execution of various ones of the available collectables are related to the interaction between the IXC switch 16 and the OA 24 defined by the interaction provisioning module 32. It should be noted, however, that in one aspect of the present invention, the execution of selected collectables, for example, the SUBR, SUBRPARM, CALLTYPE, ADDR, ADDRPARM, OLI, OLIPARM collectables may initiate actions which modify the sequence of execution of the collectables based upon information maintained in the subscriber provisioning module 34.

More specifically, the FLEXFEAT DPIDX option can modify the sequence of execution of the collectables based on subscriber number processing using any one of the REPLACE, APPEND, INSERT or EXECUTE actions. This is also applicable for ES FLEXVAL use. The digit collectables VALIDATE option supports a validation failure action of DPIDX which allows the interaction to be modified based upon validation failures. Finally, the table STDPRTCT UAX selector can modify the sequence of execution of the collectables based upon subscriber number processing using any one of the REPLACE, APPEND, INSERT or EXECUTE actions.

Of these, the FLEXFEAT DPIDX is applicable for the SUBR, SUBRPARM and CALLTYPE collectables. Here, the interaction may be modified based upon the receipt and processing of certain subscriber numbers or interaction scenarios. The VALIDATE DPIDX FAILACT option is available for the SUBR, SUBRPARM, ADDR, ADDRPARM, OLI and OLIPARM collectables. Here, the interaction may be modified based upon the failure to successfully process the received digit information. The STDPRTCT UAX selector is applicable to the ADDR and ADDRPARM collectables. Here, the interaction may be modified based upon the receipt and processing of specific called party address digit. For these, the DO, GOTO and INCLUDE collectables provide the ability to unconditionally modify the collectable list while the IF collectable provides the ability to conditionally modify the collectable list based upon varying conditions such as the digits received, the nature of the digits received, the receipt (or failure to receive) specific information or the time of day.

During execution, the aforementioned subscriber information related collectables go through a series of stages. In a PARSE stage, the collectable determines if the required digit information has already been gathered. In a REQUEST stage, the collectable gathers more digit information (if necessary). Next, the collectable enters a VALIDATE stage where the received information is verified and the subscriber is identified using information maintained by the subscriber provisioning module 34. Finally, the collectables enters a APPLY FEATURES stage during which the collectable activates and processes features and characteristics of the subscriber retrieved from the subscriber provisioning module 34. For example, the sequence of execution for the collectables may be modified in accordance with the FLEXFEAT DPIDX option. Once the subscriber information related collectable passes through these four stages, the execution thereof is complete and the collectable manager 98 proceeds to the next collectable in the sequence of execution.

Although illustrative embodiments of the invention have been shown and described, other modifications, changes, and substitutions are intended n the foregoing disclosure. Accordingly, it is appropriate that the appended claims be construed broadly and in a manner consistent with the scope of the invention.

What is claimed is:

1. A switch for a telecommunications network, said switch comprising:

a call processing application, said call processing application handling interactions with originating agents;

an interaction provisioning module in which a plurality of collectables, each comprised of at least one instruction to be processed during execution thereof, reside, said interaction provisioning module coupled to said call processing application; and a collectable management application coupled to said interaction provisioning module, said collectable manager maintaining a list of selected collectables to be executed during said interactions with originating agents and a sequence of execution for said list of selected collectables;

said call processing application handling said interactions with originating agents by executing said collectables maintained in said list in accordance with said sequence of execution;

at least one of said collectables maintained in said list containing instructions which, when executed, modifies said sequence of execution.

2. The switch of claim 1 wherein a first one of said at least one collectable maintained in said list containing instructions which, when executed, modifies said sequence of execution contains instructions which insert at least one collectable residing within said interaction provisioning module but not maintained on said list of selected collectable into said sequence of execution.

3. The switch of claim 2 wherein said first one of said at least one collectable maintained in said list inserts said at least one inserted collectable into said sequence of execution by forming a sub-list of said at least one inserted collectable, branching said list to said sub-list when said first one of said at least one collectable maintained in said list is executed and branching to a next one of said at least one collectable maintained in said list when a last one of said at least one inserted collectable of said sub-list is executed.

4. The switch of claim 1 wherein a first one of said at least one collectable maintained in said list containing instructions which, when executed, modifies said sequence of execution contains instructions which append at least one collectable to said list of selected collectables.

5. The switch of claim 1 wherein a first one of said at least one collectable maintained in said list containing instructions which, when executed, modifies said sequence of execution contains instructions which replace at least one collectable maintained in said list of collectables with at least one collectable not maintained in said list.

6. The switch of claim 1 wherein a first one of said at least one collectable maintained in said list containing instructions which, when executed, modifies said sequence of execution contains instructions which insert at least one additional collectable into said sequence of execution between said first one of said at least one collectable maintained in said list and a next one of said at least one collectable maintained in said list.

7. The switch of claim 1 and further comprising:

a provisioning application coupled to said interaction module;

said provisioning application providing said interaction module with said plurality of collectables and said sequence of execution.

8. The switch of claim 1 and further comprising:

a subscriber provisioning module in which subscriber database information is maintained, said subscriber provisioning module coupled to said call processing application;

wherein at least one of said collectables maintained in said list contains instructions which, when executed, modifies said sequence of execution based upon said subscriber database information maintained in said subscriber provisioning module.

9. A telecommunications network, comprising:

a terminal;

an originating agent;

a switch, said originating agent coupling said terminal with said switch;

means for provisioning said switch with a plurality of collectables, each one of said plurality of collectables containing at least one instruction suitable for execution during an interaction between said switch and said terminal;

means for provisioning said switch with an interaction framework comprised of a list of selected ones of said plurality of collectables and a sequence in which said selected ones of said plurality of collectables are to be executed during said interaction between said switch and said terminal; and means for modifying said sequence of execution.

10. The telecommunications network of claim 9 and further comprising:

means for provisioning said switch with subscriber database information; and means for modifying said sequence of execution based upon said subscriber database information.

11. The telecommunications network of claim 9 and further comprising:

a user interface coupled to said switch;

wherein a system administrator may selectively modify said plurality of collectables and/or said interaction framework provisioned to said switch via said user interface.

12. A method for provisioning a switch for interactions with terminals, comprising the steps of:

provisioning said switch with a plurality of collectables, each containing at least one instruction suitable for execution during an interaction with a terminal;

selecting, from said plurality of collectables, a set of at least two collectables to be executed during said interaction;

selecting a sequence in which said at least two collectables are executed during said interaction; and interacting with said terminal by executing, in said selected sequence, said set of at least two collectables;

wherein the step of interacting with said terminal by executing, in said selected sequence, said set of at least two collectables further comprises the step of modifying said sequence of execution.

13. The method of claim 12 wherein the step of modifying said sequence of execution is performed by a first collectable included in said set of collectables.

14. The method of claim 13 wherein the step of modifying said sequence of execution further comprises the step of:

executing, by said first collectable, at least one instruction maintained thereby;

wherein execution of said at least one instruction modifies said sequence of execution.

15. The method of claim 14 and further comprising the steps of:

provisioning said switch with subscriber database information; and modifying said sequence of execution based upon said provisioned subscriber database information.

16. The method of claim 15 and further comprising the step of inserting, in response to execution of said at least one instruction, an additional collectable into said sequence of execution.

17. The method of claim 15 and further comprising the steps of:

forming a sub-sequence of execution comprised of at least one additional collectable; and branching said sequence of execution to said sub-sequence of execution;

wherein said forming and branching steps are performed in response to execution of said at least one instruction.

18. The method of claim 15 and further comprising the step of appending, in response to execution of said at least one instruction, an additional collectable to said set of collectables.

19. The method of claim 15 and further comprising the step of replacing, in response to execution of said at least one instruction, a first one of said set of collectables with a next collectable.

* * * * *